(12) United States Patent
Srinivasan et al.

(10) Patent No.: US 8,291,433 B2
(45) Date of Patent: Oct. 16, 2012

(54) UNIFIED, CONFIGURABLE SERVICES STACK FOR INTEGRATION OF ENTERPRISE APPLICATIONS

(75) Inventors: Ashok Srinivasan, Woodinville, WA (US); Alexander N. Samoylenko, Redmond, WA (US); Vinod Kumar, Redmond, WA (US); Michael Merz, Redmond, WA (US)

(73) Assignee: Microsoft Corporation, Redmond, WA (US)

( * ) Notice: Subject to any disclaimer, the term of this patent is extended or adjusted under 35 U.S.C. 154(b) by 1113 days.

(21) Appl. No.: 12/163,938

(22) Filed: Jun. 27, 2008

(65) Prior Publication Data
US 2009/0328067 A1 Dec. 31, 2009

(51) Int. Cl.
*G06F 9/44* (2006.01)
(52) U.S. Cl. ........................ 719/316; 717/106
(58) Field of Classification Search .............. 719/310, 719/315, 316, 328; 717/106
See application file for complete search history.

(56) References Cited

U.S. PATENT DOCUMENTS

| | | | |
|---|---|---|---|
| 6,345,239 B1 * | 2/2002 | Bowman-Amuah | 703/6 |
| 6,427,132 B1 * | 7/2002 | Bowman-Amuah | 703/22 |
| 6,957,186 B1 * | 10/2005 | Guheen et al. | 705/323 |
| 7,177,909 B2 | 2/2007 | Stark et al. | |
| 7,197,480 B1 * | 3/2007 | Chollon et al. | 705/26.61 |
| 7,315,826 B1 * | 1/2008 | Guheen et al. | 705/7.29 |
| 7,350,209 B2 * | 3/2008 | Shum | 718/104 |
| 7,444,643 B2 * | 10/2008 | Lo et al. | 719/311 |
| 7,730,162 B2 * | 6/2010 | Lynch et al. | 709/218 |
| 7,895,095 B2 * | 2/2011 | Chollon et al. | 705/30 |
| 2005/0268326 A1 | 12/2005 | Bhargavan et al. | |
| 2006/0075042 A1 | 4/2006 | Wang et al. | |
| 2006/0080352 A1 | 4/2006 | Boubez et al. | |
| 2006/0168132 A1 | 7/2006 | Bunter et al. | |
| 2007/0156670 A1 * | 7/2007 | Lim | 707/4 |
| 2007/0250813 A1 | 10/2007 | Sanghvi et al. | |
| 2008/0066149 A1 * | 3/2008 | Lim | 726/1 |
| 2009/0025012 A1 * | 1/2009 | Kelnberger | 719/315 |

OTHER PUBLICATIONS

Doddavula, S., et al., "Enterprise Application Framework for SOA Realization," SETLabs Briefings, vol. 5, No. 1, Jan.-Mar. 2007, Bangalore India, Infosys Technologies Limited, http://www.infosys.com/research/publications/setlabs-briefings-soa.pdf.

\* cited by examiner

*Primary Examiner* — Van Nguyen
(74) *Attorney, Agent, or Firm* — Perkins Coie LLP

(57) ABSTRACT

A system and method for generating application code and an external interface for a service class, in an enterprise resource planning (ERP) system is provided. The system receives a definition of a service class from a user via a user interface tool. The definition of the service class specifies a query for the service class and operations that are to be enabled for the service class. The system automatically generates application code for the service class, which enables the service class to be used by an internal endpoint of the ERP system. The application code is customizable by the user; the user may add additional operations to the service class. In addition, the system automatically generates an external interface for the service class, which enables the service class to be used by an external endpoint of the ERP system without needing knowledge of the application code.

18 Claims, 15 Drawing Sheets

```xml
<?xml version="1.0" encoding="utf-8" ?>
<Envelope xmlns="http://schemas.microsoft.com/dynamics/2008/01/documents/Message">
  <Header>
    <MessageId>{80341978-BE1E-411B-83F8-9DDBF8C9C437}</MessageId>
    <SourceEndpointUser>domain\johndoe</SourceEndpointUser>
    <SourceEndpoint>Contoso</SourceEndpoint>
    <DestinationEndpoint>Fabrikam</DestinationEndpoint>
    <Action>http://schemas.microsoft.com/dynamics/2008/01/services/SalesOrderService/create</Action>
  </Header>
  <Body>
    <MessageParts>
     - <SalesOrder xmlns="http://schemas.microsoft.com/dynamics/2008/01/documents/SalesOrder">
        <DocPurpose>Original</DocPurpose>
      - <SalesTable class="entity" xmlns="http://schemas.microsoft.com/dynamics/2008/01/documents/SalesOrder">
          <CurrencyCode>EUR</CurrencyCode>
          <CustAccount>4000</CustAccount>
          <DeliveryDate>2007-10-11</DeliveryDate>
          <Payment>D30</Payment>
          <PurchOrderFormNum>PO</PurchOrderFormNum>
         - <SalesLine class="entity">
            <ItemId>ESB-007</ItemId>
            <SalesQty>1.2</SalesQty>
            <SalesUnit>Pcs</SalesUnit>
          </SalesLine>
        </SalesTable>
      </SalesOrder>
    </MessageParts>
  </Body>
</Envelope>
```

UNIFIED, CONFIGURABLE SERVICES STACK FOR INTEGRATION OF ENTERPRISE APPLICATIONS

An enterprise resource planning (ERP) system integrates applications and processes of one or more businesses or organizations into a unified system. Each business or organization, subdivision of a business or organization, or application (herein collectively referred to as endpoints) may access one or more services of the ERP system. For example, a customer relationship management (CRM) department may request modification of a customer record, while a manufacturing department may update the status of an item of a sales order.

An ERP system may be integrated with a variety of endpoints inside and outside of the ERP system. Each endpoint may have different capabilities and requirements for integration with the ERP system. For example, an internal endpoint may have knowledge of the application code language, while an external endpoint may not have such knowledge, and may communicate with the ERP system via a different means. Or, an internal endpoint may be permitted to access ERP services with minimal security, while an external endpoint may be subject to enhanced security requirements before it is permitted to access ERP services. As another example, one endpoint may be permitted to update and delete system data, while another endpoint may receive reports containing system data, but may not be permitted to update or delete system data.

SUMMARY

A system and method for generating both application code and an external interface for a service class in an enterprise resource planning (ERP) system is provided. The system receives a definition of a service class from a user via a user interface tool, such as a wizard. The definition of the service class specifies a query on which the service class is to be based, in addition to operations, or methods, that are to be enabled for the service class. Based on the received definition, the system automatically generates application code for the service class, which enables the service class to be consumed by an internal endpoint of the ERP system. The application code is customizable by the user; the user may add additional operations to the service class in addition to the operations that were automatically generated by the system. In addition, based on the generated application code and any customization of the application code by the user, the system automatically generates an external interface for the service class, which enables the service class to be consumed by an external endpoint of the ERP system without requiring the external endpoint to have knowledge of the application code.

BRIEF DESCRIPTION OF THE DRAWINGS

FIG. 16 is a display diagram of an example of a service request message.

DETAILED DESCRIPTION

A system and method for generating both application code and an external interface for a service class in an enterprise resource planning (ERP) system is provided. The system receives a definition of a service class from a user via a user interface tool, such as a wizard. The user interface tool solicits from the user the information necessary to create application code for the service class. Through the user interface tool, the user selects a query on which the service class is to be based. A query controls the data that is to be retrieved from the ERP system to generate a document. The user also specifies the operations, or methods, that are to be enabled for the service class. Service operations may include create, delete, find, findkeys, read, and update.

Based on the definition of the service class received from the user, the system automatically generates application code for the service class. The application code includes a service class, Axd classes, and Ax<Table> classes. A service class exposes application business logic to endpoints through the service operations. Axd and Ax<Table> classes provide layers of abstraction from the underlying database tables from which data is retrieved to create, read, or update a document. Each of these classes is described in more detail below. The generated application code enables the service to be consumed by an internal endpoint of the ERP system, which understands the language in which the application code is written. In some embodiments, application code is written in an object-oriented language, such as X++. The application code is customizable by the user; the user may add additional operations to the service class in addition to the operations that were automatically generated by the system.

In addition, based on the generated application code and any customization of the application code by the user, the system automatically generates an external interface for the service class, which enables the service to be consumed by an external endpoint of the enterprise resource planning system. External endpoints may not understand the language in which the application code is written. An external interface allows external endpoints to consume services of the ERP without needing to have such an understanding of the application code. In some embodiments, the external interface is generated by serializing application code into a standards-based format, such as XML Schema Definition (XSD), Web Services Description Language (WSDL), or another format. In some embodiments, the external interface is generated in a programming language, such as C#.

Figure 1:
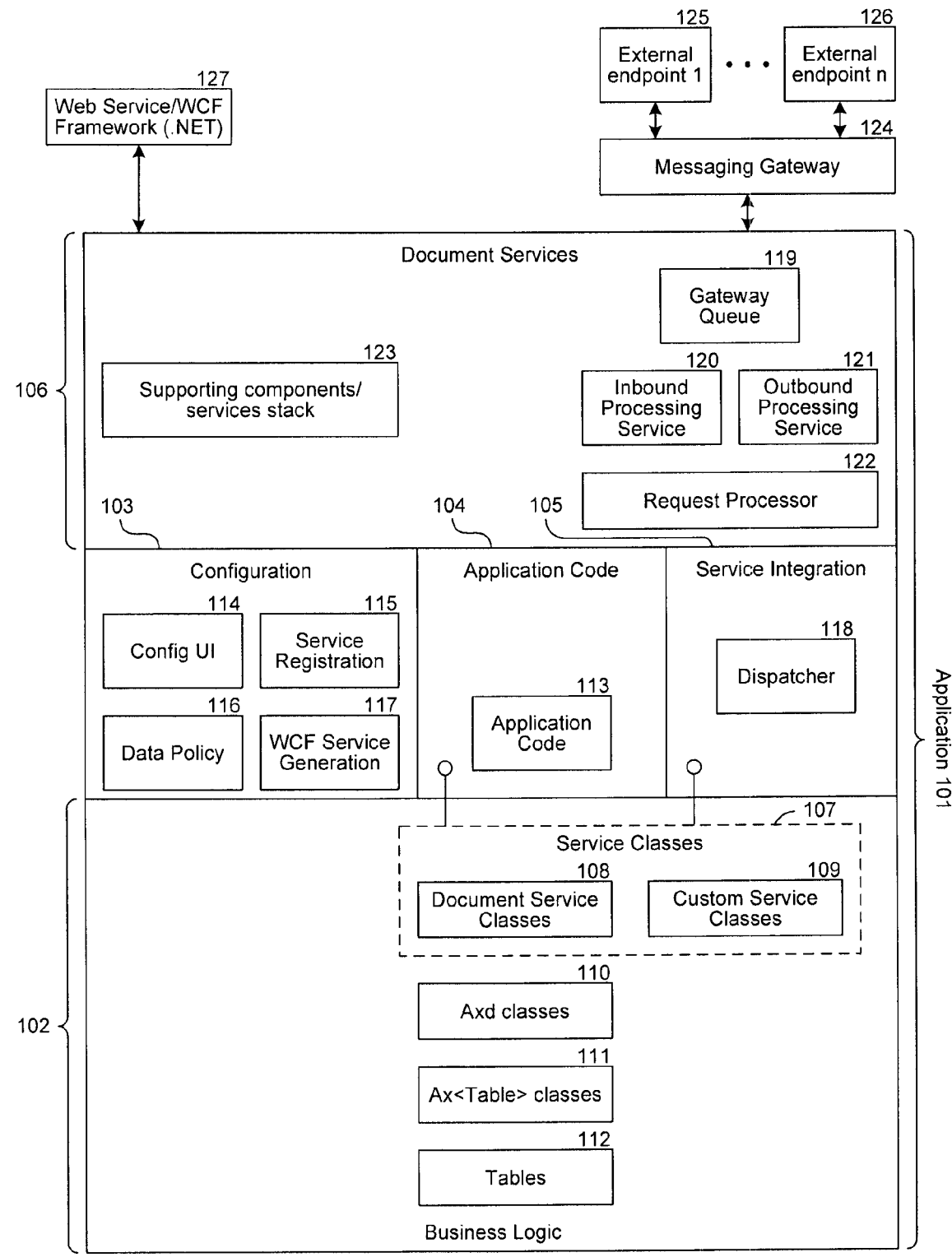
FIG. 1 is a block diagram that illustrates components of a system for generating application code and an external interface for a service class in an ERP system in some embodiments.

FIG. 1 is a block diagram that illustrates components of a system for generating application code and an external interface for a service class in an ERP system in some embodiments. FIG. 1 depicts an Application Integration Framework (AIF), which exposes the services of an ERP application to both internal and external endpoints. The AIF is an extensible framework that enables application functionality to be integrated with endpoints, and allows data to be exchanged between the application and the endpoints. An endpoint designates the source or the destination of the message. Examples of endpoints include applications that use Microsoft Message Queuing (MSMQ), file systems, web services, and Microsoft BizTalk Server. In particular, the AIF permits application business logic to be exposed as services that may be consumed by internal and external endpoints.

An ERP application 101 includes a business logic component 102, a configuration component 103, an application code component 104, a service integration component 105, and a document services component 106. The business logic component 102 comprises application data, its format, and the business rules that govern the data. The business logic component includes service classes 107, Axd classes 110, and Ax<Table> classes 111, which expose the application business logic. The service classes 107 include document service classes 108, which are related to a particular type of document (e.g., a sales order) and custom service classes 109, which may be used for any type of document or any non-document-based logic, such as generic application code that is to be generated and exposed as a service to an external endpoint. Each of these classes is described in detail below. In addition, the business logic component includes database tables 112, in which the application data is stored.

The configuration component 103 of the application comprises elements that control registration and exposure of ERP services. The configuration component includes a configuration user interface 114, service registration 115, data policy 116, and WCF service generation 117. These elements are described in detail below.

The application code component 104 of the application comprises the object-oriented code that is implemented by the ERP system. The application code component includes application code 113. The business logic of the application, described above, is exposed to the application code component 104 via the service classes 107. For example, an ERP service may be consumed by an internal class of the application code 113.

The service integration component 105 of the application facilitates access to ERP services by external endpoints. The business logic of the application is exposed to the service integration component via the service classes 107. Similarly, the service integration component exposes the application business logic to the document services component 106, which in turn exposes the application business logic to external endpoints 1 125 to n 126. The service integration component includes a dispatcher 118, which dispatches service request messages from external endpoints to the proper service class, invoking the appropriate service class operation, or method. In addition, the dispatcher dispatches outgoing messages, including response messages to service requests, from the ERP system to external endpoints.

The document services component 106 of the application exposes the business logic of the application to the external endpoints 1 125 to n 126. In addition, external endpoints may make service calls through web service/WCF framework 127. The document services component enables the exchange of data with the external endpoints by sending and receiving data in a format that is understandable to the external endpoints, such as XML documents. For example, XML documents may represent application business objects such as customers, vendors, sales orders, and other business objects. The document services component 106 includes a gateway queue 119, an inbound processing service 120, an outbound processing service 121, and a request processor 122, which process service request messages received from external endpoints and transmit outgoing messages from the application to the external endpoints. In addition, the document services component includes supporting components 123, which are additional, value added functionality that may be used by a user to customize a services stack, which is described below. These components are discussed in detail below.

The computing devices on which the system for generating application code and an external interface for a service class is implemented may include a central processing unit, memory, input devices (e.g., keyboard and pointing devices), output devices (e.g., display devices), and storage devices (e.g., disk drives). The memory and storage devices are computer-readable storage media that may contain instructions that implement the message processing system. In addition, the data structures and message structures may be stored or transmitted via a data transmission medium, such as a signal on a communication link. Various communication links may be used, such as the Internet, a local area network, a wide area network, a point-to-point dial-up connection, a cell phone network, and so on.

Embodiments of the system for generating application code and an external interface for a service class may be implemented in various operating environments that include personal computers, server computers, hand-held or laptop devices, multiprocessor systems, microprocessor-based systems, programmable consumer electronics, digital cameras, network PCs, minicomputers, mainframe computers, distributed computing environments that include any of the above systems or devices, and so on. The computer systems may be cell phones, personal digital assistants, smart phones, personal computers, programmable consumer electronics, digital cameras, and so on.

The system for generating application code and an external interface for a service class may be described in the general context of computer-executable instructions, such as program modules, executed by one or more computers or other devices. Generally, program modules include routines, programs, objects, components, data structures, and so on that perform particular tasks or implement particular abstract data types. Typically, the functionality of the program modules may be combined or distributed as desired in various embodiments.

Figure 2:
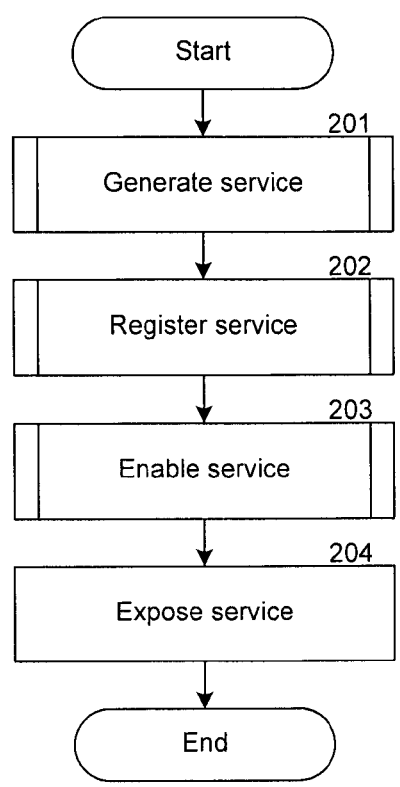
FIG. 2 is a flow diagram that illustrates a process that is used to generate and expose a service of an ERP system in some embodiments.

FIG. 2 is a flow diagram that illustrates a process that is used to generate and expose a service of an ERP system in some embodiments. In block 201, a service class is generated by the system. Generation of a service class includes receiving a definition of a service class from a user, generating application code for the service class, and optionally receiving customization of the application code by the user. This process is described in more detail below. Once a service class has been generated, in block 202, the service class is registered by the user. The registration process includes adding the service class to the Services node of an Application Object Tree (AOT). This process is described in more detail below. Once a service class has been registered in the Services node, in block 203, the service class is enabled by a system administrator. Enabling the service class permits the service class to be exposed to endpoints, as described in more detail below. In block 204, the service class is exposed via application code to internal endpoints and via an external interface to external endpoints. Once a service is exposed, it may be consumed by one or more endpoints.

1. Service Generation

A service exposes the business logic that is implemented by the application. A service comprises a service contract, a service implementation, and data types used by the service operations, or methods. A service contract is an interface that is used by a consumer of the service class; this interface is implemented by the service class.

Figure 3:
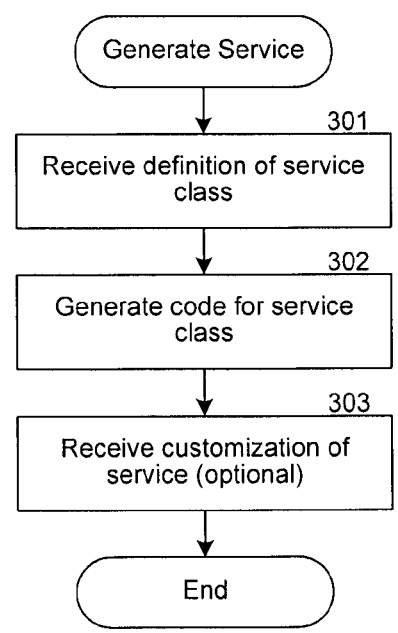
FIG. 3 is a flow diagram that illustrates a process that is used to generate application code for a service class in an ERP system in some embodiments.

Services may be generated with minimal configuration. In some embodiments, services may be generated without the need for a user to write application code that implements the service. In such embodiments, a user interface tool, such as a wizard, may be used to generate services. FIG. 3 is a flow diagram that illustrates a process that is used to generate application code for a service class in an ERP system in some embodiments. In block 301, the process receives a definition of a service class from a user via a user interface tool. The user interface tool collects from the user the necessary information for generating application code for the service class. Once a definition of a service class has been received, in block 302, the process generates the application code for the service class. The generated application code includes various classes that offer object-oriented definitions of the application business logic. Once the system has generated the application code for the service class, in block 303, the process receives optional customization of the generated service from the user. The service class may be extended by the user to implement service operations in addition to those automatically generated by the system. The process depicted by FIG. 3 is described in more detail below.

a. Definition of Service Class

Figure 4:
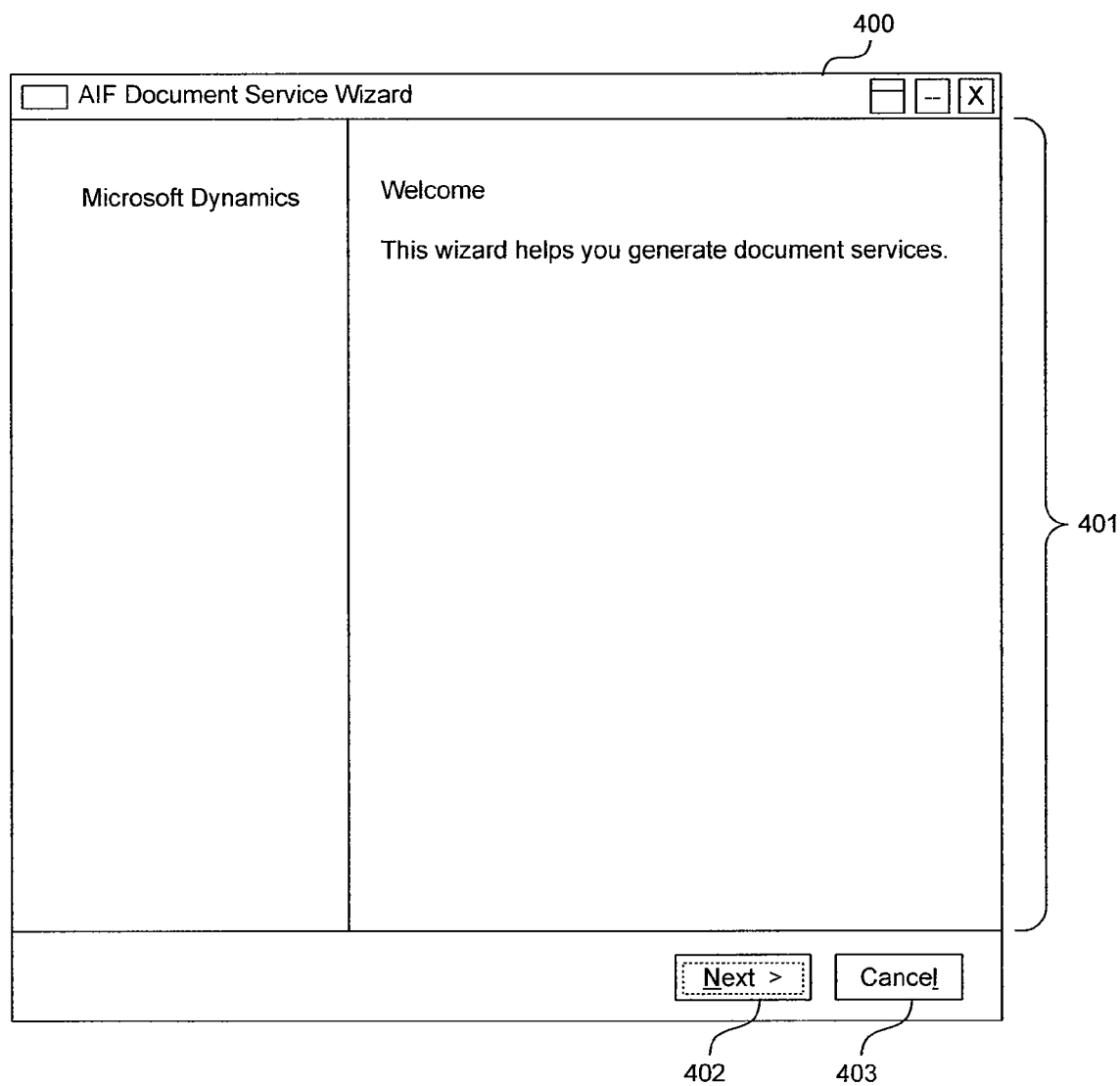
FIGS. 4-7 are a series of display diagrams that illustrate a user interface tool that is used to receive a definition of a service class in some embodiments.

As described above, services may be generated without the need for a user to write application code that implements the service. Instead, a user interface tool, such as a wizard, may be used to generate services. In block 301, the generate service process receives a definition of a service class from a user via a user interface tool, such as a wizard. The user interface tool collects from the user the necessary information for generating application code for the service class, such as by presenting the user with a series of dialog boxes. FIGS. 4-7 are a series of display diagrams that illustrate a user interface tool that is used to receive a definition of a service class from a user in some embodiments. FIG. 4 is a display diagram that illustrates a display 400 that may be used to introduce a user to the user interface tool in some embodiments. A display area 401 may provide the user with an introduction to the user interface tool and/or instructions on how to use the tool. The user may select the Next button 402 to continue using the user interface tool, or may select the Cancel button 403 to terminate the user interface tool.

Figure 5:
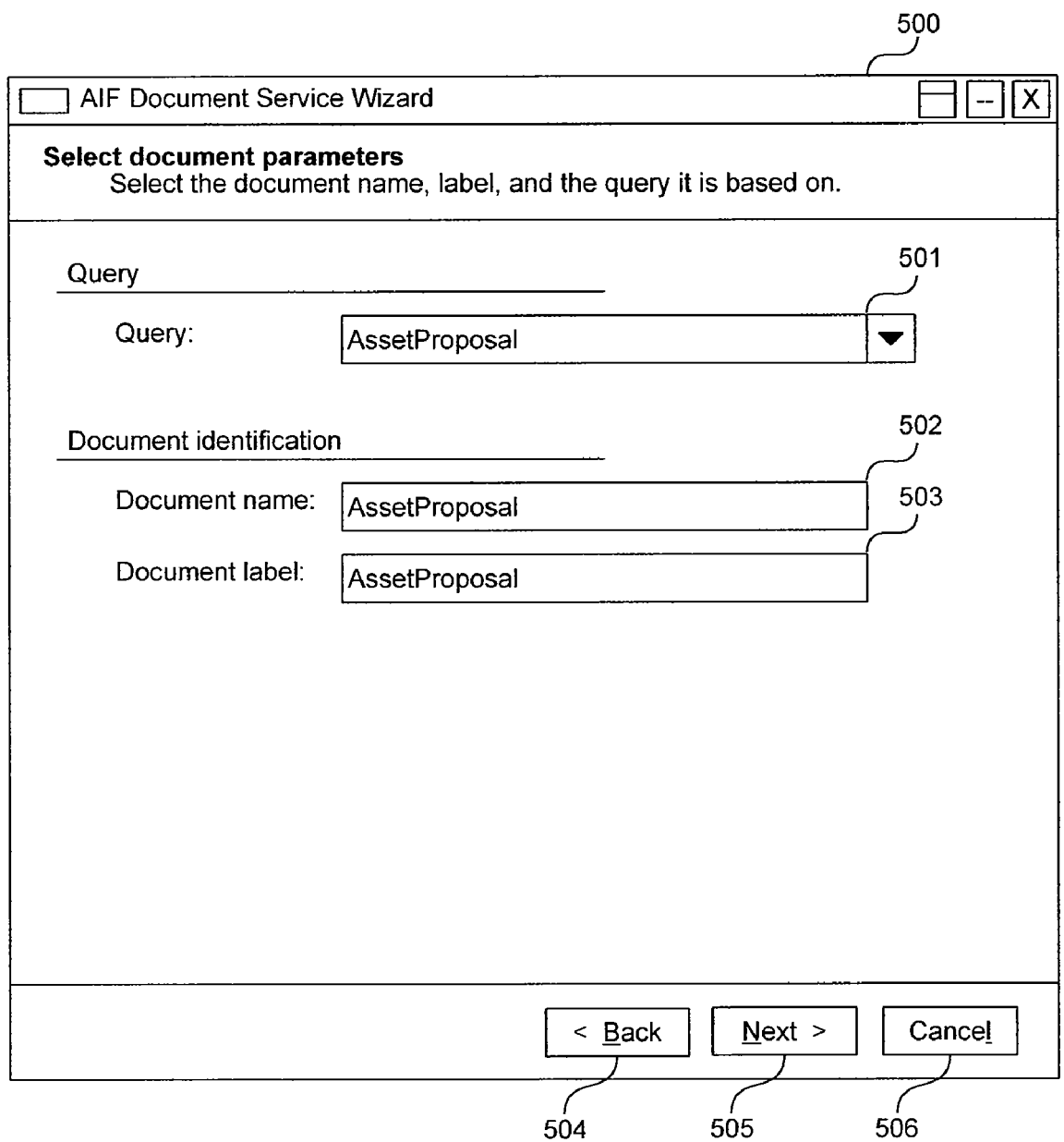

When the user selects the Next button 402, the user may be presented with a display diagram such as that illustrated by FIG. 5. FIG. 5 illustrates a display 500 that is used to collect the parameters for a document from the user in some embodiments. A document is a representation of the application business data. That is, a document reflects the data as it exists in the application. For example, a sales order document may contain a sales order header with sales order data and corresponding sales order lines. As depicted by FIG. 5, the user selects a query 501 on which the document is to be based. A query describes the structure of an XML document and controls the data that is retrieved from the application for the document. Queries have been previously defined; a user selects a query from the available queries, such as via a drop down box as illustrated by FIG. 5. As depicted by FIG. 5, the user has selected that the document is to be based on the AssetProposal query. In addition to specifying the query on which the document is to be based, the user specifies document identifiers, including a document name 502 and a document label 503. A document name is an external name for the document; a document label is a user friendly for the document. For example, a sales order may have a document name of "SalesOrder" and a document label of "sales order document." As illustrated by FIG. 5, the user has indicated that the document name and document label are both to be AssetProposal. The user may select the Back button 504 to return to the previous display 400, the Next button 505 to continue using the user interface tool, or the Cancel button 506 to terminate the user interface tool.

Figure 6:
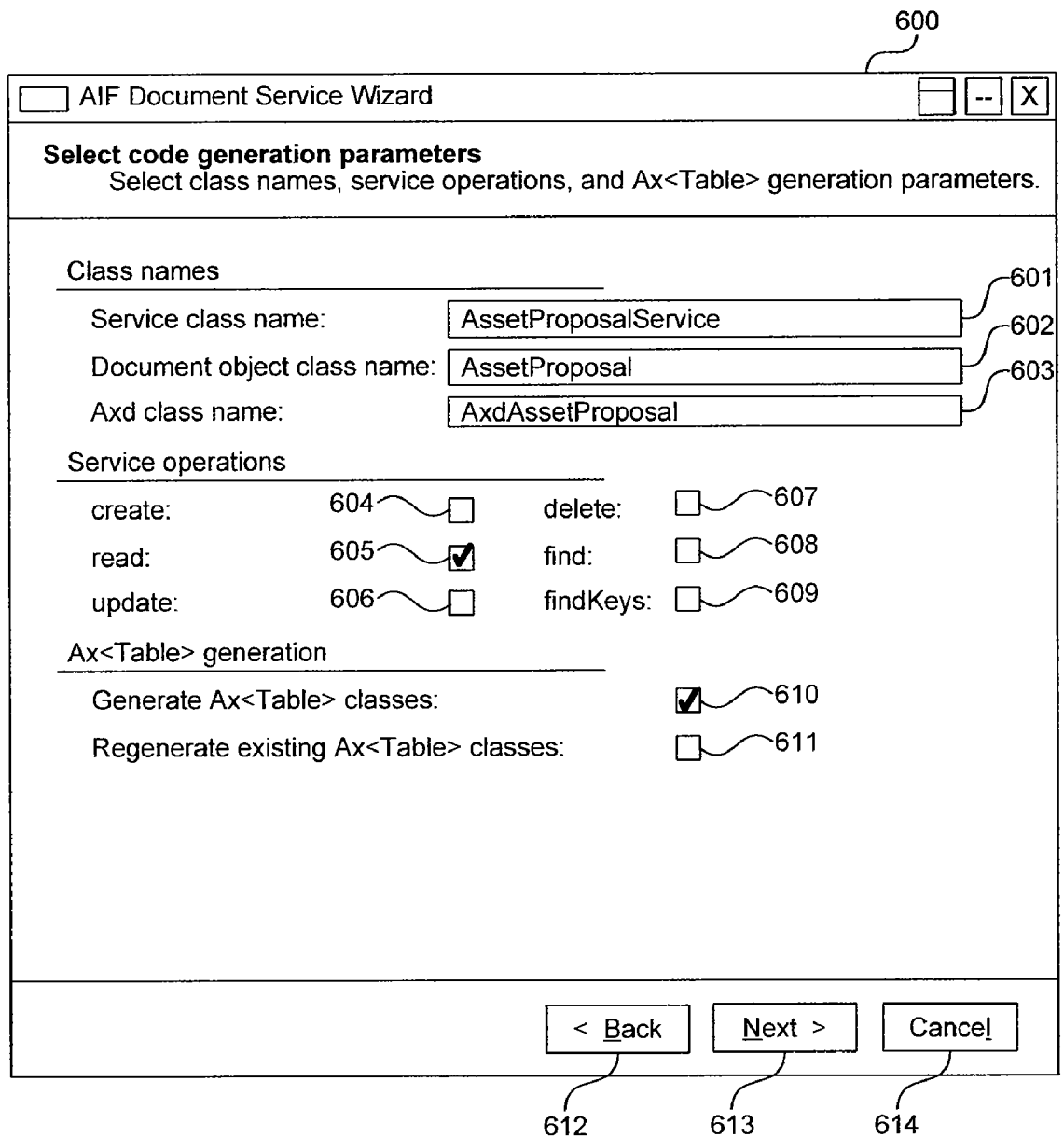

When the user selects the Next button 505, the user may be presented with a display diagram such as that illustrated by FIG. 6. FIG. 6 illustrates a display 600 that is used to select parameters for generation of application code for the service class. The display solicits from the user class names, including a service class name 601, a document object class name 602, and an Axd class name 603. Classes are object-oriented type definitions that define the structure and behavior of the application business logic. Each of these classes is described in more detail below.

A service class is the point of contact for endpoints. Service classes expose the application business logic to endpoints through service operations, or methods, including create, delete, find, findkeys, read, and update. The service classes provide the interface for performing these operations in the application. A document object class represents an entire document.

An Axd class is an application document class. These classes have an XML-based interface and present XML data as electronic documents. Each Axd class represents a single document. For example, AxdSalesOrder may be an Axd class for a sales order document. Each Axd class has an associated query and can represent data from multiple tables. Axd classes provide a layer of abstraction from the underlying tables and enable users to implement business logic. Axd classes can automatically generate an XML schema that describes the equivalent XML document based on the associated query in the AOT. Axd classes eliminate the need for an external endpoint to be knowledgeable of the application data model or business rules. Upon receiving a service request message, Axd classes process the message XML, apply the appropriate business logic to the message contents, and persist data to the underlying tables using the Ax<Table> classes. In the case of an outbound message, data from the tables is directly serialized into XML.

As illustrated by FIG. 6, the user has indicated that the service class name is to be AssetProposalService, the document object class name is to be AssetProposal, and the Axd class name is to be AxdAssetProposal. In addition, display 600 solicits from the user a selection of the service operations, or methods, that will be supported by the service. Supported service operations may include create 604, read 605, update 606, delete 607, find 608, and findkeys 609. As illustrated by FIG. 6, the user has specified that the service will support the read operation 605.

The user may also specify whether Ax<Table> classes are to be generated 610 or whether existing Ax<Table> classes are to be regenerated 611. Ax<Table> classes manage access to application data and encapsulate application business logic associated with the creation and modification of data in the database tables. Each Ax<Table> class represents a single table in the AOT. For example, AxSalesTable may be an Ax<Table> class for a table SalesTable. Axd classes use Ax<Table> classes to manipulate data in the database tables, such as reading from or writing to the underlying tables. For example, the AxdSalesOrder document class may use the AxSalesTable class to access the SalesTable table.

Once the user has selected parameters for the generation of the application code for the service class, the user may select the Back button 612 to return to the previous display 500, the Next button 613 to continue using the user interface tool, or the Cancel button 614 to terminate the user interface generation tool.

Figure 7:
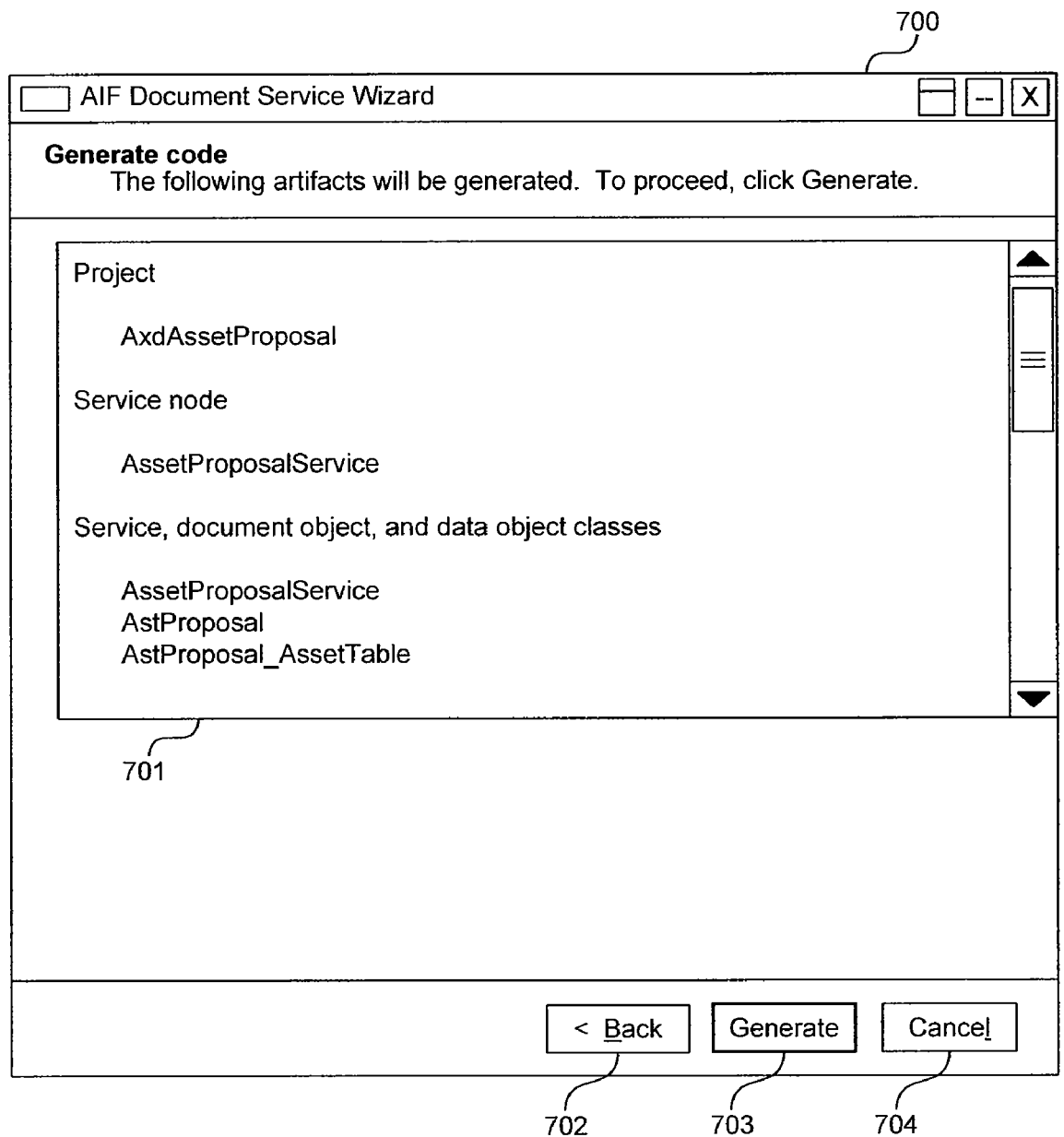

When the user selects the Next button 613, the user may be presented with a display diagram such as that illustrated by FIG. 7. FIG. 7 illustrates a display 700 that is used to display the application code artifacts that are to be generated for the service. The display area 701 indicates the project to be generated, the service that is to be added to the service node, and the service classes, document object classes, and data object classes to be generated. Service classes and document object classes are described above in reference to FIG. 6. A data object class represents a class that can be serialized to and deserialized from XML. Data object classes are created for each data source in a query. A data object class encapsulates XML data and provides an object interface to the data. This enables users to work with the data by using objects and properties instead of XML. Data object classes are passed as parameters in the service operations.

As illustrated by FIG. 7, the project to be generated is AxdAssetProposal; the AssetProposalService service will be added to the service node; and the classes to be generated include AssetProposalService, AstProposal, and AstProposal_AssetTable. The user may select the Back button 702 to return to the previous display 600, the Generate button 703 to generate the application code for the service class, or the Cancel button 704 to terminate the user interface tool.

Figure 8:
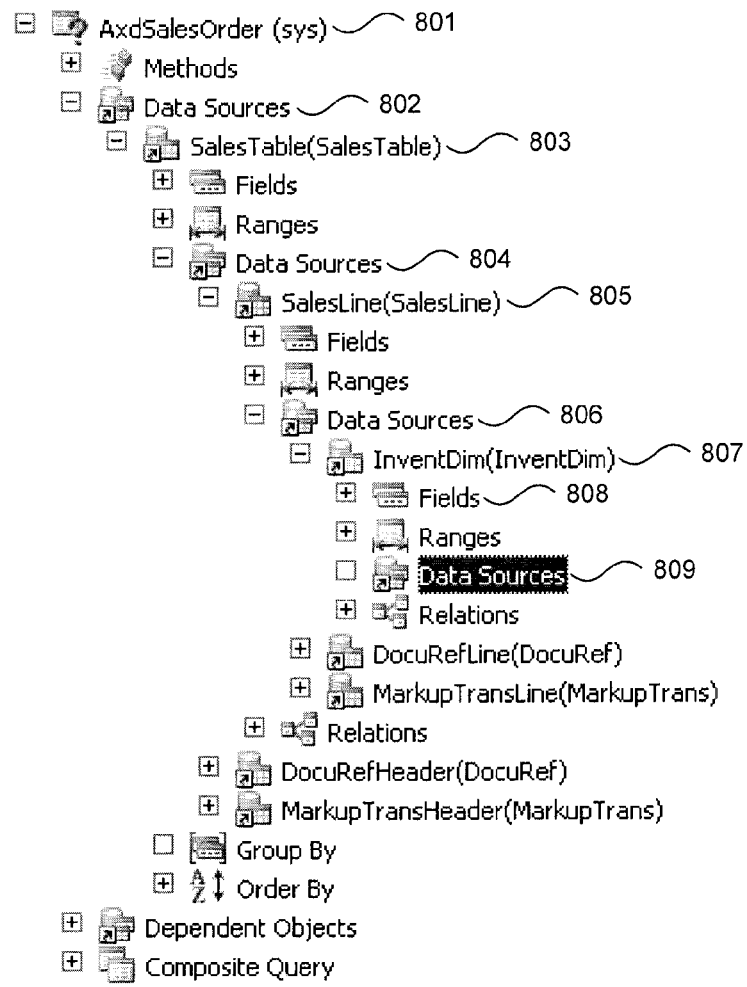
FIG. 8 is a display diagram that illustrates an example of a query.

FIG. 8 is a display diagram that illustrates an example of a query. As described above in reference to FIG. 5, each document is generated based on a previously defined query. FIG. 8 depicts a query AxdSalesOrder 801. The (sys) abbreviation following the query name indicates that this query resides at the system level of the application. Application elements, such as queries, forms, tables, and other elements may reside at different layers within the application. These layers include system, business, customer, user, and other layers.

In a query, the user defines one or more tables from which data is to be retrieved. By selecting Data Sources 802, the user may specify a table from which data is to be retrieved. In the example illustrated by FIG. 8, the user has selected the SalesTable table 803. The specified table is the root table via which relationships with other tables are to be established. Tables are addressed in the order in which they appear in the query. In the example illustrated by FIG. 8, the user has selected additional data sources: Data Source 804, the SalesLine table 805; and DataSource 806, the InventDim (i.e., Inventory Dimension) table 807. Inventory dimensions describe the characteristics of items or item lots. By selecting Fields 808, the user can specify certain fields (i.e., columns) of the specified table to display; otherwise, all fields of the specified table will be displayed.

In some embodiments, queries have the same name as the Axd class with which they are associated. For example, the query for the AxdPurchaseRequisition document class would also be named AxdPurchaseRequisition.

b. Generation of Application Code for Service Class

Returning to FIG. 3, after the process has received the definition of the service class, including selection of a previously defined query, in block 302 the process generates the application code for the service class. In some embodiments, generated application code includes document classes, data object classes, service classes, Axd classes, and Ax<Table> classes. The process generates an document class for the query, and a data object class for each table contained in the query. For example, consider the query illustrated by Table 1 below. Line 1 indicates the name of the query, AxdCustomer. Lines 2 and 3 indicate the tables contained in the query, customer table CustTable and customer address table CustAddress.

TABLE 1

| 1 | AxdCustomer (Query) |
| 2 | CustTable (Table) |
| 3 | CustAddress (Table) |

In response to the above query, the process may generate the document class and data object classes illustrated by Table 2 below. Line 1 indicates an document class named myCustomer, which extends the AifDocument class. The AifDocument class is described in more detail below, in reference to Table 3. The name for the document class (e.g., myCustomer) may be entered by a user via the user interface tool, as described above. Lines 2 and 3 indicate data object classes myCustomer_CustTable and myCustomer_CustAddress. In some embodiments, data object classes are named in accordance with the name of the document class (e.g., myCustomer) and the table, or data source, from which the data is to be obtained (e.g., CustTable or CustAddress).

TABLE 2

| 1 | myCustomer (Extends AifDocument) |
| 2 | myCustomer_CustTable |
| 3 | myCustomer_CustAddress |

AifDocument is an abstract class that is extended by a document class. In addition, the AifDocument class is consumed by the AifDocumentService class and implements the AifXmlSerializable interface. The AifDocument class is illustrated by Table 3 below. Line 1 indicates that the AifDocument class extends the AfStronglyTypedDataContainer class, which in turn implements the AifXmlSerializable interface. The AifXmlSerializable interface is described in more detail below, in reference to Table 4. Line 4 indicates a getName method, which returns a custom name for the data object. The custom name is used to identify the root element in the schema, and is also used as the external object name. Line 5 indicates a serialize method, which serializes a document into XML. Line 6 indicates a getAxdInstance method, which returns the Axd class instance corresponding to the document. Line 7 indicates a getDescription method, which returns a user friendly description of the service.

TABLE 3

```
1  abstract class AifDocument extends AfStronglyTypedDataContainer
2  {
3      public void new(str dataContainerType);
4      public QueryName getQueryName( );
5      public AifXml serialize( );
6      public AxdBase getAxdInstance( );
7      public AifDescription getDescription( );
8  }
```

In some embodiments, the AifXmlSerializable interface is implemented by a class used as a parameter or by a value returned by a service operation. Service operations are not restricted to a fixed set of signatures, return values, or data types. Any basic data type or serializable data type is permitted, as are any number of parameters and a return value of any data type. Service classes can expose any type of interface as long as each operation parameter and return value is a basic data type that maps to an XML data type or implements the AifXmlSerializable interface. The AifXmlSerializable interface is illustrated by Table 4 below. Line 3 indicates a getSchema method, which retrieves the schema of the object. A schema defines the data elements that participate in a data exchange and the rules for those data elements. The schema for the document is generated by iterating through the document query that defines the structure of the document. The schema uses the names of the Ax<Table> classes and their properties to name the XML elements. Document data is mapped from the query to the XML schema. Line 4 indicates a getRootName method, which retrieves the name of the root element of the XML document. Line 5 indicates a serialize method, which serializes the object into XML. Line 6 indicates a deserialize method, which deserializes the object from XML.

TABLE 4

```
1    interface AifXmlSerializable
2    {
3        AifXml getSchema( );
4        public AifDocumentName getRootName( );
5        AifXml serialize( );
6        void deserialize(AifXml xml);
7    }
```

An example of application code that may be generated for a sales order service is illustrated by Table 5 below. Line 1 indicates a generated Axd class named AxdSalesOrder. As described above, an Axd class is an application document class; each Axd class represents a single document. Lines 3 and 5 indicate generated Ax<Table> classes named AxSalesTable and AxSalesLine. As described above, each Ax<Table> class represents a single table in the AOT.

Line 7 indicates a service class named mySalesOrderService, which extends the AifDocumentService class. The AifDocumentService class is described below in reference to Table 6. Lines 9-12 indicate the service operations, or methods, supported by the mySalesOrderService class, which include create, read, update, and delete. Line 15 indicates an document class mySalesOrder, which extends the AifDocument class. The AifDocument class is described below in reference to Table 6. Line 17 indicates a data container dataContainer of data type AfDataContainer. Data containers are data objects that are used to pass data to and from service classes. Line 19 indicates a method named getName, which returns a custom name for a document. The custom name is used to identify the root element of the schema and is used as the external document name. Line 20 indicates a method named getDescription, which returns a user friendly description of the document. Line 21 indicates a method named getQueryName, which returns a name of a query that defines the structure of the document.

Line 25 indicates a customizable class named mySalesTable, which implements AfStronglyTypedDataContainer and the AifXmlSerializable interface. The AifXmlSerializable interface is described above, in reference to Table 4. Line 33 indicates a customizable class named mySalesLine, which implements AfStronglyTypedDataContainer and the AifXmlSerializable interface.

TABLE 5

```
1  AxdClass: AxdSalesOrder
2
3  Ax<Table> Class: AxSalesTable
4
5  Ax<Table> Class: AxSalesLine
6
7  class mySalesOrderService extends AifDocumentService
8  {
9      AifEntityKeyList CreateSalesOrder (mySalesOrder salesOrder);
10     mySalesOrder ReadSalesOrder (AifEntityKeyList entityKeyList);
11     AifEntityKeyList UpdateSalesOrder (AifEntityKeyList entityKeyList, mySalesOrder salesOrder);
12     AifEntityKeyList DeleteSalesOrderList (AifEntityKeyList entityKeyList);
13 }
14
15 class mySalesOrder extends AifDocument
16 {
17     AfDataContainer dataContainer;
18
19     AifEntityName getName( );
20     AifDescription getDescription( );
21     QueryName getQueryName( );
22
23 }
24
25 class mySalesTable implements AfStronglyTypedDataContainer, AifXmlSerializable
26 {
27     AfDataContainer dataContainer;
28
29     // SalesTable fields will be exposed as properties automatically
30     SalesId parmSalesId (SalesId salesId);
31 }
32
33 class mySalesLine implements AfStronglyTypedDataContainer, AifXmlSerializable
34 {
35     AfDataContainer dataContainer;
36
37     // SalesLine fields will be exposed as properties automatically
38     ItemId parmItemId(ItemId itemId);
39 }
```

AifDocumentService is an abstract service class that provides a default, or base, implementation of a document service. Document service classes extend the AifDocumentService class and delegate operations to the AifDocumentService class. Service operations, or methods, include create, read, update, delete, find, and findkeys. The AifDocumentService class is illustrated by Table 6 below. Line 1 indicates that the AifDocumentService class implements the AifCustomizableService interface. The AifCustomizableService interface is described in more detail below, in reference to Table 8.

Lines 3-6 indicate AifCustomizableService methods that are supported by the AifDocumentService class. Line 3 indicates a getConstraints method, which returns the constraints list for the last called method. Line 4 indicates a getCorrelationEntityKeys method, which returns entity keys to correlate with the previous message. Line 5 indicates a getDisplayMenuItemName method, which retrieves the display menu item for the configuration form for the service. Line 6 indicates a setOperationContext method, which sets the operation context of the current method. The AifCustomizableService methods are described in more detail below, in reference to Table 8.

Lines 9-14 indicate the operations, or methods, that are supported by the AifDocumentService class, including create, read, update, delete, find, and findkeys. These methods are used by services that are derived from the AifDocumentService class.

TABLE 6

```
1  abstract class AifDocumentService implements AifCustomizableService
2  {
3      public AifConstraintListCollection getConstraints( );
4      public AifEntityKeyList getCorrelationEntityKeys( );
5      public MenuItemNameDisplay getDisplayMenuItemName(AifOperationName
       operationName);
6      public void setOperationContext(AifOperationContext _operationContext);
7
8      // Main protected methods for use by derived class
9      protected AifEntityKeyList createList(AifDocument document);
10     protected AifDocument readList(AifEntityKeyList entityKeyList, AifDocument document);
11     protected void updateList(AifEntityKeyList entityKeyList, AifDocument document);
12     protected void deleteList(AifEntityKeyList entityKeyList, AifDocument document);
13     protected AifEntityKeyList findKeyList(AifQueryCriteria queryCriteria, AifDocument
       document);
14     protected AifDocument findList(AifQueryCriteria queryCriteria, AifDocument document);
15
16     protected AifEndpointActionPolicyInfo getEndpointActionPolicy(AifDocument document);
17     protected AifOperationContext getOperationContext( );
18     protected AifPropertyBag getSendParameters( );
19 }
```

An example of delegation of a service operation to the AifDocumentService class is illustrated in Table 7 below. Line 1 indicates a class named mySalesOrderService, which extends the AifDocumentService class. Line 3 indicates a CreateSalesOrder method which takes a sales order of data type mySalesOrder and returns a value of data type AifEntityKey. Line 10 indicates that the CreateSalesOrder method delegates the create operation to the AifDocumentService class, by invoking the CreateEntity method.

TABLE 7

```
1  class mySalesOrderService extends AifDocumentService
2  {
3      AifEntityKey CreateSalesOrder(mySalesOrder salesOrder);
4  }
5
```

TABLE 7-continued

```
6      // example create method implementation
7      AifEntityKey CreateSalesOrder(mySalesOrder salesOrder)
8      {
9          // delegate to AifDocumentService
10         return this.CreateEntity(salesOrder);
11     }
``` c. Customization of Service Class

Once the system has generated the application code for the service class, the service class may be extended by the user to implement service operations in addition to those automatically generated by the system. That is, the service may be customized to implement operations other than the default methods of create, read, update, delete, find, and findkeys. In addition, the user has the ability to modify the application code that was automatically generated by the system. Returning to FIG. 3, once application code has been generated in block 302, in block 303, the process receives from the user customization of the generated service, if any.

A service class that supports customization implements the AifCustomizableService interface. Because the base document service class generated by the user interface tool, or wizard, implements this interface, all service classes generated by the user interface tool implement this interface. In some embodiments, the AifCustomizableService interface should be implemented if the service class needs support for constraints, correlation, custom configuration, and/or allowing the application code to determine the current context. This interface provides the service class with access to the operation context, which can be used to access additional information about an operation. Providing a separate interface for customized service behavior allows the service class to provide a clean and uniform service contract that applies regardless of the service consumer. The AifCustomizableService interface is optional; the decision of whether to allow customization of the service is left to the service class.

The AifCustomizableService interface is illustrated by Table 8 below. Line 3 indicates a getConstraints method. This method is called after each service operation to allow the service class to return any constraints associated with the service operation. If there are no constraints, the return value is null. Line 4 indicates a getCorrelationEntityKeys method. This method is called after each service operation to allow the service to correlate the message with any entities that have been created or updated. If no correlation is required, the return value is null. Line 5 indicates a getDisplayMenuItemName method. If the service class supports custom configuration, this method returns the menu item name of the configuration form that is to be displayed for the specified method. In such case, the configuration of the service operation is enabled. If the service class does not support custom configuration, this method returns an empty string. Line 6 indicates a setOperationContext method. This method is called before each service operation to provide the service class with information about the service operation.

TABLE 8

```
1  interface AIfCustomizableService
2  {
3      AifConstraintListCollection getConstraints( );
4      AifEntityKeyList getCorrelationEntityKeys( );
5      MenuItemNameDisplay
         getDisplayMenuItemName(AifOperationName operationName);
6      void setOperationContext(AifOperationContext
         operationContext);
7  }
```

2. Service Registration

Figure 9:
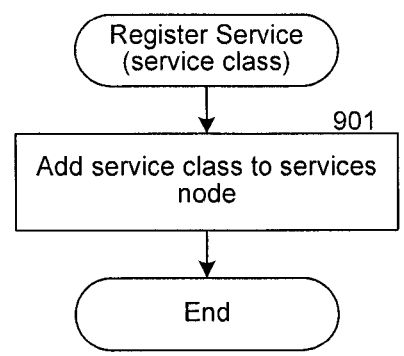
FIG. 9 is a flow diagram that illustrates a process that is used to register a service class in some embodiments.

Each service has a corresponding service node in an Application Object Tree (AOT) under a Services node. The service node exposes the service class methods as service operations. Returning to FIG. 2, once a service has been generated in block 201, as described above, in block 202 the service is registered. FIG. 9 is a flow diagram that illustrates a process that is used to register a service class in some embodiments. The process is passed an indication of the service class generated in block 201 of FIG. 2. In block 901, the service class is added to the Services node of an AOT. The AOT is a user control in the application development environment that manages application elements, such as presentation elements, business logic elements, and data model elements. Each of these elements has corresponding application source code that comprises an object's definition. Examples of application elements in the AOT include object definitions, configuration and security keys, forms, reports, queries, services, and other application elements. An AOT service node can be used to view and modify the properties of a service and its operations. A service node includes the service operations to be exposed for the service. In addition, a service node allows a user to change the external names of services and service operations.

Figure 10:
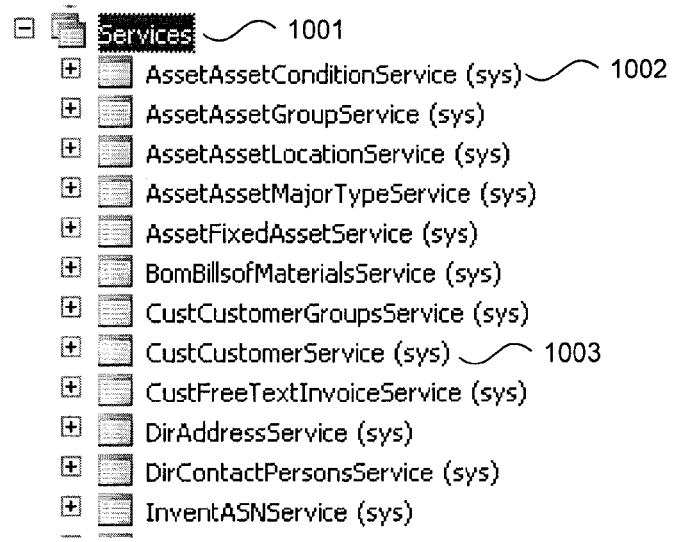
FIG. 10 is a display diagram that illustrates a Services node of an Application Object Tree in some embodiments.

FIG. 10 is a display diagram that illustrates the Services node of the AOT in some embodiments. The Services node 1001 contains each registered service, such as AssetAssetConditionService 1002 and CustCustomerService 1003. As described above, the (sys) abbreviation following each service depicted in FIG. 10 indicates that the service resides at the system level of the application.

Figure 11:
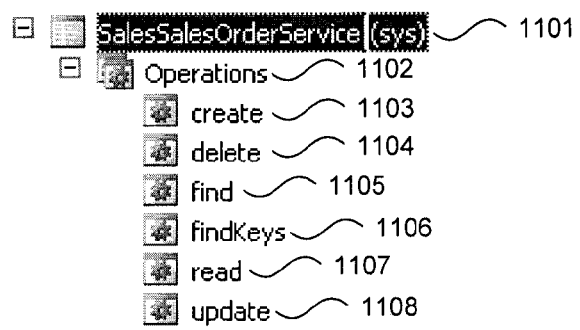
FIG. 11 is a display diagram that illustrates operations supported by a service node of the Services node in some embodiments.

FIG. 11 is a display diagram that illustrates service operations supported by a registered service in some embodiments. FIG. 11 depicts a service SalesSalesOrderService, which has been added to the Services node of the AOT. When a user expands the SalesSalesOrderService node 1101, the user may view the operations 1102 supported by the service. As depicted by FIG. 11, these operations may include create 1103, delete 1104, find 1105, findKeys 1106, read 1107, and update 1108.

3. Enabling Services

Returning to FIG. 2, once a service has been registered in block 202 by adding the service class to the Services node of the AOT, in block 203 the service is enabled by a system administrator. Once a service has been enabled, it may be exposed at block 204 to various endpoints.

Figure 12:
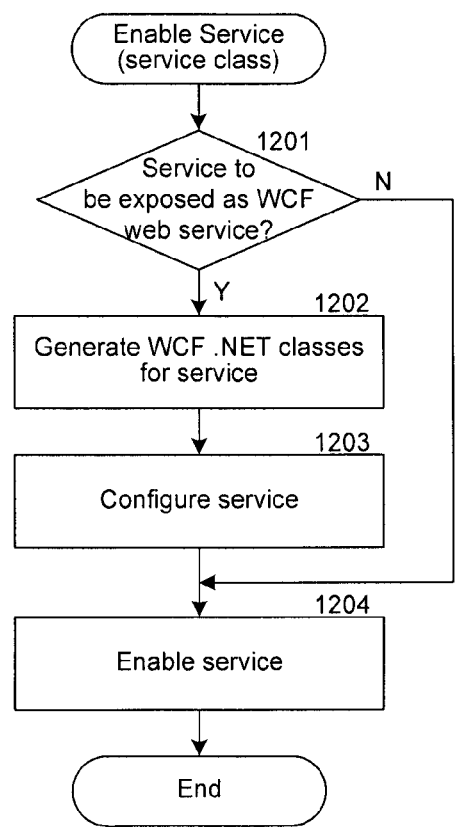
FIG. 12 is a flow diagram that illustrates a process that is used to enable a service class in some embodiments.

Returning to FIG. 1, services may be exposed as WCF web services, via the web service/WCF framework 127, and/or services may be exposed to external endpoints 1 125 to n 126 and to the application code 113. In addition, endpoints 1 to n may use the web service/WCF interface to consume a service. FIG. 12 is a flow diagram that illustrates a process that is used to enable a service class in some embodiments. In decision block 1201, the process determines whether the service is to be exposed as a WCF web service. If a service is to be exposed as a WCF web service, the service must be configured and a WCF service generated. In any case, the service must be enabled. If the process determines that the service is to be exposed as a WCF web service, in block 1202 the process generates WCF .NET classes for the service. In addition, in block 1203, the process configures the service. Whether or not the service is to be exposed as a web service, in block 1204 the process enables the service.

Figure 13:
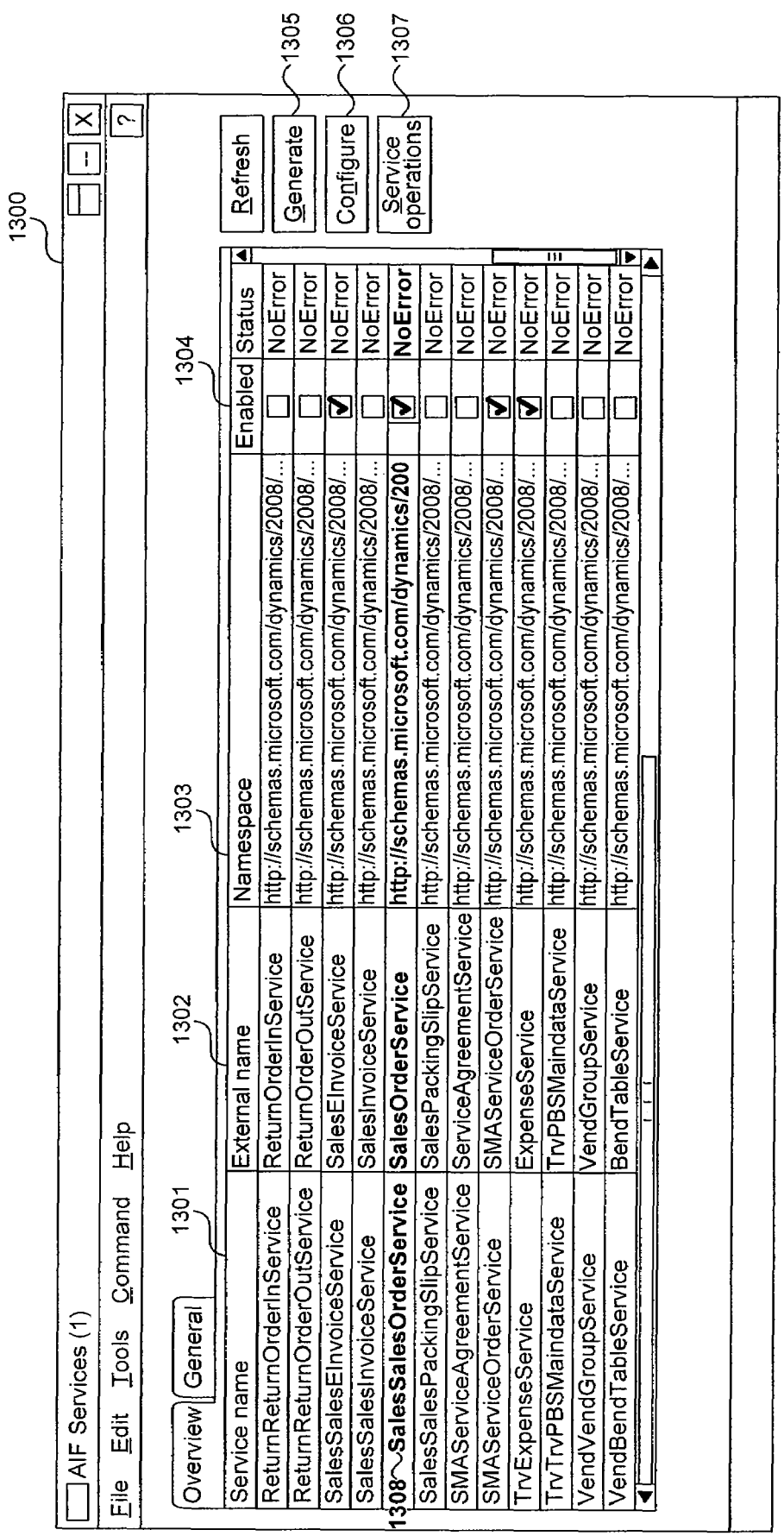
FIG. 13 is a display diagram that illustrates a user interface by which a system administrator may enable, generate, and configure service classes in some embodiments.

FIG. 13 is a display diagram that illustrates a display 1300 by which a system administrator may enable, generate, and configure service classes in some embodiments. Column 1301 lists the services that are registered with the Services node of the AOT; the service names are the names that are specified in the Services node. Column 1302 lists the corresponding external name of the service. Column 1303 lists the namespace for the service. Column 1304 contains an indication as to whether each service is enabled. For example, as illustrated by FIG. 13, SalesSalesOrderService 1308 is enabled, as indicated by the checked box associated with the service in column 1304. Such a service may be consumed by both internal and external endpoints, excluding WCF web clients. If a service is to be exposed as a WCF web service, the system administrator generates 1305 WCF .NET classes for the service and configures 1306 the service. The system administrator may view the service operations associated with a service, such as by highlighting the service and selecting the Service operations button 1307.

4. Service Consumption

Services may be consumed from within the ERP system—i.e., from an internal endpoint—or from outside of the ERP system by an external service client—i.e., an external endpoint. For example, internal endpoints may include internal application classes. External endpoints may include applications that use Microsoft Message Queuing (MSMQ), file systems, web services, and Microsoft BizTalk Server.

An external endpoint requests access to a service of the ERP system through a service request message. In some embodiments, the service request message is written in XML. FIG. 16 is a display diagram of an example of a service request message. A service request message comprises a message header 1601-1607 and a message body 1608-1626. The message header may include the following fields: MessageId, SourceEndpointUser, SourceEndpoint, DestinationEndpoint, Action, RequestMessageId, and ConversationId. For example, the message depicted by FIG. 16 includes MessageID 1602, SourceEndpointUser 1603, SourceEndpoint 1604, DestinationEndpoint 1605, and Action 1607. All header fields; are optional except the Action field, which specifies the service class and service operation. An Action should be specified in the form of Namespace/Service/Operation. For example, the Action specified in the message depicted by FIG. 16 is SalesOrderService/create, indicating that the create operation of the SalesOrderService class is to be invoked. If the optional header fields are omitted, default values may be used for the fields as follows: MessageId—an internal id will be created for the message; SourceEndpointUser—the submitting user will be used; SourceEndpoint—the default endpoint will be used; DestinationEndpoint—the default company of the source endpoint user will be used. A RequestMessageId is ignored for an inbound message, but is set by the ERP system for an outbound (e.g., response) message to be equal to the MessageId of the corresponding inbound request message. A ConversationId, or subconversation identifier, uniquely identifies service request messages of a conversation that are to be processed serially or indicates whether the service request messages can be processed in parallel. Subconversation identifiers are described in additional detail in commonly owned U.S. patent application Ser. No. 12/135,104, entitled Conversational Parallelism for Message Processing, filed Jun. 6, 2008.

Figure 14:
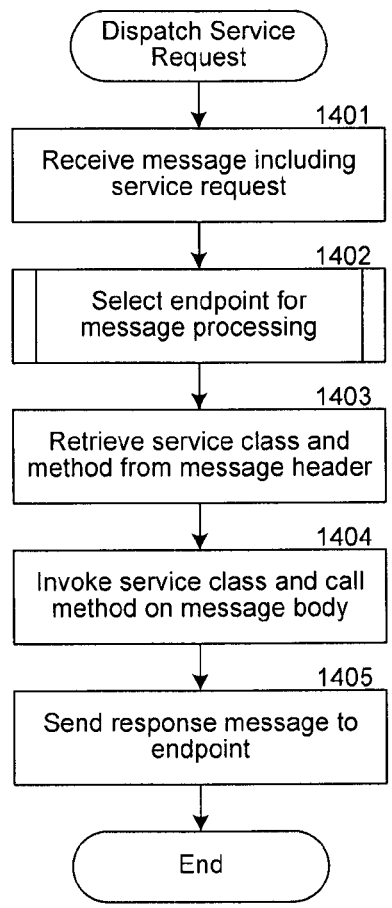
FIG. 14 is a flow diagram that illustrates a process that is used to dispatch a service request in some embodiments.

FIG. 14 is a flow diagram that illustrates a process that is used to dispatch a service request in some embodiments. In block 1401, the process receives a message that includes a service request. As described above, a service request message may include optional metadata that specifies the source endpoint (i.e., SourceEndpoint) that submitted the service request message. In block 1402, the process selects an endpoint for processing the service request message. This process is described in more detail by FIG. 15.

Figure 15:
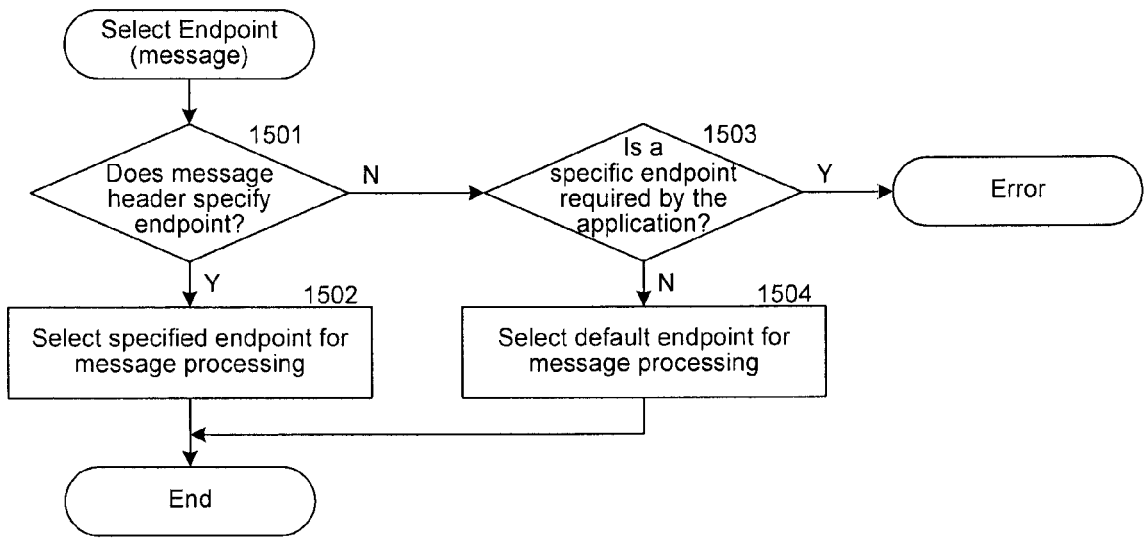
FIG. 15 is a flow diagram that illustrates a process, that is used to select an endpoint for message processing in some embodiments.

FIG. 15 is a flow diagram that illustrates a process that is used to select an endpoint for message processing in some embodiments. The process takes as input a service request message. In decision block 1501, the process determines whether the message header specifies an endpoint. If a source endpoint is specified, in block 1502 the process selects the specified endpoint to process the message. For example, for the message depicted by FIG. 16, the process would select "Contoso" as the endpoint for processing the message. If an endpoint is not specified, in block 1503 the process determines whether a specific endpoint is required by the application. If the application requires a specific endpoint and an endpoint is not specified, the process returns an error. If the application does not require a specific endpoint, in block 1504 the process uses a default endpoint to process the service request message. That is, an endpoint need not be specified in order to process the service request message. The default endpoint may invoke any service operation. In some embodiments, the default endpoint has an endpoint id of "Default" or " " (i.e., null) and a name of "Default Endpoint."

Returning to FIG. 14, once an endpoint has been selected for message processing, in block 1403 the process retrieves the specified service class and method from the message header. For example, in the message depicted by FIG. 16, the process would retrieve the SalesOrderService class and the create operation. In block 1404, the process invokes the specified service class and calls the specified method on the body of the message. In the message depicted by FIG. 16, the process would invoke the create operation of the SalesOrderService class on the body 1608-1626 of the message. In block 1405, the process sends a response message to the source endpoint, indicating that the service operation was performed.

An internal endpoint, i.e., application code 113, requests access to a service of the ERP system via the object-oriented language of the application. An example of how an internal endpoint may consume a service is illustrated by Table 9 below.

TABLE 9

| 1 | mySalesOrder salesOrder; |
| 2 | mySalesTable salesTable; |
| 3 | mySalesLine salesLine; |
| 4 | AifEntityKeyList entityKeys; |
| 5 | mySalesOrderService salesOrderService; |
| 6 | |
| 7 | salesOrder = new mySalesOrder( ); |
| 8 | |
| 9 | salesTable = salesOrder.getHeader( ); |
| 10 | salesTable.parmInvoiceAccount('5678'); |
| 11 | salesTable.parmCustAccount('1234'); |
| 12 | |
| 13 | salesLine = salesOrder.addSalesLine( ); |
| 14 | salesLine.parmSalesId(salesTable.parmSalesId( )); |
| 15 | salesLine.parmItemId('B-pack1'); |
| 16 | salesLine.parmSalesQty(110.00); |
| 17 | salesLine.parmSalesUnit('Pcs'); |
| 18 | |
| 19 | salesOrderService = new mySalesOrderService( ); |
| 20 | entityKeys = salesOrderService.CreateSalesOrder(salesOrder); | a. Stack Components

Stack components refer to additional, value added functionality that can be leveraged by service classes. Stack components may include document logging, message correlation, security enhancements, value substitution, idempotency support, pipelines, data policy, XML transformation, constraint validation, and other components.

Stack components may be enabled and configured dynamically, per endpoint. The default endpoint is configured with all generic (i.e., non-endpoint-specific) stack components; these stack components can be used to process service request messages without requiring the stack to be configured for the messages. For a non-default endpoint, the available stack components are those components for which the endpoint has been configured. In order to leverage certain stack components, such as message correlation and constraint validation, a service class may implement AifCustomizableService, as described above in reference to Table 8.

b. Partial Updates

Application data may be updated according to a full update or a partial update. A full update comprises a service request message that includes a complete document. Fields in application database tables are updated with the fields from the submitted data. If there are fields in a database table that do not correspond to fields in the submitted data, the database table fields are cleared according to rules for the field data type. A partial document comprises a service request message that includes transmission of a partial document—e.g., only the changed information. Only the fields that are included in the submitted service request message are updated in the database table. If there are fields in a database table that do not correspond to fields in the submitted data, the database fields retain their original values.

For both full and partial updates, a service request message header specifies the update service operation. For example, as illustrated by Table 10 below, the Action of a message may be CustomerService/update. An example of an XML service request message that comprises a full update is illustrated by Table 10 below. The message requests an update to a customer and a customer address.

TABLE 10

| 1 | <?xml version="1.0" encoding="utf-8" ?> |
| 2 | <Envelope xmlns="http://schemas.microsoft.com/dynamics/2006/02/documents/Message"> |

TABLE 10-continued

```
3   <Header>
4       <MessageId></MessageId>
5       <SourceEndpointUser></SourceEndpointUser>
6       <SourceEndpoint></SourceEndpoint>
7       <DestinationEndpoint></DestinationEndpoint>
8       <Action>http://www.microsoft.com/dynamics/services/2008/
        01/CustomerService/update</Action>
9       <ConversationId></ConversationId>
10  </Header>
11  <Body>
12      <MessageParts
13          xmlns:xsi=http://www.w3.org/2001/XMLSchema-instance
14          xmlns:xsd=http://www.w3.org/2001/XMLSchema
15          xmlns="http://www.microsoft.com/dynamics/services/2008/01">
16      <EntityKeyList xmlns="http://schemas.microsoft.com/dynamics/
        2006/02/documents/EntityKeyList">
17          <EntityKey xmlns="http://schemas.microsoft.com/
            dynamics/2006/02/documents/EntityKey">
18              <KeyData>
19                  <KeyField>
20                      <Field>AccountNum</Field>
21                      <Value>4507</Value>
22                  </KeyField>
23              </KeyData>
24          </EntityKey>
25      </EntityKeyList>
26
27      <Customer xmlns="http://schemas.microsoft.com/dynamics/
        2006/02/documents/Customer">
28          <DocPurpose>Original</DocPurpose>
29          <SenderId>DAT</SenderId>
30          <CustTable class="entity">
31              <__DocumentHash>d8a12aa51360d017d6e936d76797aca2
                </__DocumentHash>
32              <AccountNum>4507</AccountNum>
33              <AccountStatement>Always</AccountStatement>
34              <Address>7212 9th Street Fargo, ND 58102 US</Address>
35              <Blocked>No</Blocked>
36              <CashDisc>5D2%</CashDisc>
37              <City>Fargo</City>
38              <CountryRegionId>US</CountryRegionId>
39              <County>Cass</County>
40              <Currency>USD</Currency>
41              <CustGroup>30</CustGroup>
42              <ForecastDMPInclude>No</ForecastDMPInclude>
43              <GiroType>None</GiroType>
44              <GiroTypeCollectionletter>None</GiroTypeCollectionletter>
45              <GiroTypeFreeTextInvoice>None</GiroTypeFreeTextInvoice>
46              <GiroTypeInterestNote>None</GiroTypeInterestNote>
47              <GiroTypeProjInvoice>None</GiroTypeProjInvoice>
48              <InclTax>No</InclTax>
49              <InterCompanyAllowIndirectCreation>No
                </InterCompanyAllowIndirectCreation>
50              <InterCompanyAutoCreateOrders>No
                </InterCompanyAutoCreateOrders>
51              <InterCompanyDirectDelivery>No
                </InterCompanyDirectDelivery>
52              <InvoiceAddress>InvoiceAccount</InvoiceAddress>
53              <LanguageId>En-us</LanguageId>
54              <MandatoryCreditLimit>No</MandatoryCreditLimit>
55              <Name>Northwind Traders</Name>
56              <NameAlias>NW Traders</NameAlias>
57              <OneTimeCustomer>No</OneTimeCustomer>
58              <PartyId>1318</PartyId>
59              <PartyType>Organization</PartyType>
60              <PaymTermId>D30</PaymTermId>
61              <RecId>5637144604</RecId>
62              <RecVersion>1</RecVersion>
63              <RFIDCaseTagging>No</RFIDCaseTagging>
64              <RFIDItemTagging>No</RFIDItemTagging>
65              <RFIDPalletTagging>No</RFIDPalletTagging>
66              <ShipCarrierBlindShipment>No</ShipCarrierBlindShipment>
67              <ShipCarrierFuelSurcharge>No</ShipCarrierFuelSurcharge>
68              <State>ND</State>
69              <Street>7212 9th Street</Street>
70              <WebSalesOrderDisplay>WebEntered</WebSalesOrderDisplay>
71              <ZipCode>58102</ZipCode>
72              <CustAddress class="entity">
73                  <Address>111 5th Street Baltimore, MD 21210 US
                    </Address>
```

TABLE 10-continued

| | |
|---|---|
| 74 | <AddrRecId>5637144604</AddrRecId> |
| 75 | <AddrTableId>77</AddrTableId> |
| 76 | <City>Baltimore</City> |
| 77 | <CountryRegionId>US</CountryRegionId> |
| 78 | <County>Baltimore</County> |
| 79 | <DlvMode>U11A</DlvMode> |
| 80 | <DlvTerm>TERMNA3RD</DlvTerm> |
| 81 | <Name>Jane Smith</Name> |
| 82 | <RecId>5637145089</RecId> |
| 83 | <RecVersion>1</RecVersion> |
| 84 | <ShipCarrierAccount>234-456</ShipCarrierAccount> |
| 85 | <ShipCarrierAccountCode>UPS</ShipCarrierAccountCode> |
| 86 | <ShipCarrierBlindShipment>No</ShipCarrierBlindShipment> |
| 87 | <ShipCarrierID>U11A</ShipCarrierID> |
| 88 | <ShipCarrierResidential>No</ShipCarrierResidential> |
| 89 | <State>MD</State> |
| 90 | <Street>111 5th Street</Street> |
| 91 | <type>ShipCarrierTPShipping</type> |
| 92 | <ZipCode>21210</ZipCode> |
| 93 | </CustAddress> |
| 94 | </CustTable> |
| 95 | </Customer> |
| 96 | </MessageParts> |
| 97 | </Body> |
| 98 | </Envelope> |

An example of an XML service request message that comprises a partial update is illustrated by FIG. 11 below. As described above, in a partial update, only the data that is to be updated is contained in the service request message. A partial update message contains the entity key of the record to be updated, as illustrated by lines 16-25. In addition, each record of the message contains an action attribute, such as create, update, replace, or delete. For example, line 30 indicates that a customer is to be updated. The update action attribute specifies that the fields contained in the message will be updated in the database table; other database table field values remain. Line 37 indicates that an address is to be updated, while line 44 indicates that an address is to be created. The create action attribute specifies that a new record is to be created in the database table with the field values from the message. Any table fields not included in the message will be assigned default values according to the field data type and the table default logic. Line 64 indicates that an address is to be deleted from the database table. The delete action attribute deletes the records in the database table. If a service request message contains no action attributes, the message comprises a full update, as described above.

TABLE 11

| | |
|---|---|
| 1 | <?xml version="1.0" encoding="utf-8" ?> |
| 2 | <Envelope xmlns="http://schemas.microsoft.com/dynamics/2006/02/documents/Message"> |
| 3 | <Header> |
| 4 | <MessageId></MessageId> |
| 5 | <SourceEndpointUser></SourceEndpointUser> |
| 6 | <SourceEndpoint></SourceEndpoint> |
| 7 | <DestinationEndpoint></DestinationEndpoint> |
| 8 | <Action>http://www.microsoft.com/dynamics/services/2008/01/CustomerService/update</Action> |
| 9 | <ConversationId></ConversationId> |
| 10 | </Header> |
| 11 | <Body> |
| 12 | <MessageParts |
| 13 | xmlns:xsi="http://www.w3.org/2001/XMLSchema-instance" |
| 14 | xmlns:xsd="http://www.w3.org/2001/XMLSchema" |
| 15 | xmlns="http://www.microsoft.com/dynamics/services/2008/01"> |
| 16 | <EntityKeyList xmlns="http://schemas.microsoft.com/dynamics/2006/02/documents/EntitykeyList"> |
| 17 | <EntityKey xmlns="http://schemas.microsoft.com/dynamics/2006/02/documents/EntityKey"> |
| 18 | <KeyData> |
| 19 | <KeyField> |
| 20 | <Field>AccountNum</Field> |
| 21 | <Value>4507</Value> |
| 22 | </KeyField> |
| 23 | </KeyData> |
| 24 | </EntityKey> |
| 25 | </EntityKeyList> |
| 26 | |
| 27 | <Customer xmlns="http://schemas.microsoft.com/dynamics/2006/02/documents/Customer"> |
| 28 | <DocPurpose>Original</DocPurpose> |
| 29 | <SenderId>DAT</SenderId> |

TABLE 11-continued

```
30          <CustTable class="entity" action="update">
31              <AccountNum>4507</AccountNum>
32              <CreditMax xsi:nill="true"/>
33              <CustGroup>40</CustGroup>
34              <PartyType>Organization</PartyType>
35              <RecId>5637144604</RecId>
36              <RecVersion>779953820</RecVersion>
37                  <CustAddress class="entity" action="update">
38                      <AddrRecId>5637144604</AddrRecId>
39                      <AddrTableId>77</AddrTableId>
40                      <DlvMode>AIR</DlvMode>
41                      <RecId>5637145089</RecId>
42                      <RecVersion>1</RecVersion>
43                  </CustAddress>
44                  <CustAddress class="entity " action="create">
45                      <Address>2100 5th Street Baltimore, MD
                        21210 US</Address>
46                      <AddrTableId>77</AddrTableId>
47                      <City>Baltimore</City>
48                      <CountryRegionId>US</CountryRegionId>
49                      <County>Baltimore</County>
50                      <DlvMode>U11A</DlvMode>
51                      <DlvTerm>TERMNA3RD</DlvTerm>
52                      <Name>Molly Clark</Name>
53                      <ShipCarrierAccount>234-45678
                        </ShipCarrierAccount>
54                      <ShipCarrierAccountCode>UPS
                        </ShipCarrierAccountCode>
55                      <ShipCarrierBlindShipment>No
                        </ShipCarrierBlindShipment>
56                      <ShipCarrierID>U11A</ShipCarrierID>
57                      <ShipCarrierResidential>No
                        </ShipCarrierResidential>
58                      <State>MD</State>
59                      <Street>2100 5th Street</Street>
60                      <TimeZone>GMTMINUS0800PACIFICTIME</TimeZone>
61                      <type>AltDlv</type>
62                      <ZipCode>21210</ZipCode>
63                  </CustAddress>
64                  <CustAddress class="entity" action="delete">
65                      <RecId>5637145099</RecId>
66                      <RecVersion>1</RecVersion>
67                  </CustAddress>
68              </CustTable>
69          </Customer>
70      </MessageParts>
71  </Body>
72 </Envelope>
```

From the foregoing, it will be appreciated that specific embodiments of the invention have been described herein for purposes of illustration, but that various modifications may be made without deviating from the spirit and scope of the invention. Accordingly, the invention is not limited except as by the appended claims.

We claim:

1. A method of generating application code and an external interface for a service class in an enterprise resource planning system, the method comprising:
    receiving a definition of a service class from a user via a user interface tool, the definition specifying a query on which the service class is to be based and operations to be enabled for the service class;
    automatically generating application code for the service class based on the received definition, the application code enabling the service class to be consumed by an internal endpoint of the enterprise resource planning system, the application code customizable by the user by adding additional operations; and
    automatically generating an external interface for the service class based on the generated application code and any customization by the user, the external interface enabling the service class to be consumed by an external endpoint of the enterprise resource planning system without requiring the external endpoint to have knowledge of the application code,
    so that the internal and external endpoints request access to services of the enterprise resource planning system, and that the enterprise resource planning system, upon receiving from an endpoint a request to access a service, may dispatch the request to an appropriate service class.

2. The method of claim 1 wherein the query specifies data that is retrieved from the enterprise resource planning system.

3. The method of claim 1 wherein the operations are selected from a set of operations consisting of create, read, update, delete, find, and findkeys.

4. The method of claim 1, further comprising:
    registering the service class by adding the service class to a services node of an application object tree.

5. The method of claim 1, further comprising:
    enabling the service class by a system administrator.

6. The method of claim 1 wherein the application code includes classes that expose business logic of the enterprise resource planning system.

7. The method of claim 1 wherein the external endpoint is an application that uses Microsoft Message Queuing, file systems, web services, or Microsoft BizTalk server.

8. The method of claim 1 wherein the user interface tool is a wizard that collects the definition of the service class from the user.

9. A computer-readable storage medium having computer-executable instructions for implementing a method of generating application code and an external interface for a service class in an enterprise resource planning system, the method comprising:

receiving a definition of a service class from a user, the definition specifying a query on which the service class is to be based and operations to be enabled for the service class;

automatically generating application code for the service class based on the received definition, the application code exposing the service class to an internal endpoint of the enterprise resource planning system, the application code customizable by the user; and automatically generating an external interface for the service class based on the generated application code and any customization by the user, the external interface exposing the service class to an external endpoint of the enterprise resource planning system.

10. The computer-readable storage medium of claim 9 wherein the query specifies data that is to be retrieved from the enterprise resource planning system.

11. The computer-readable storage medium of claim 9 wherein the operations are selected from a group consisting of create, read, update, delete, find, and findkeys.

12. The computer-readable storage medium of claim 9, further comprising registering the service class by the user.

13. The computer-readable storage medium of claim 9 wherein the definition of the service class is received from the user via a user interface tool.

14. A computing device for generating application code and an external interface for a service class in an enterprise resource planning system, comprising:

a memory storing computer-executable instructions that when executed perform a method comprising:

receiving a definition of a service class from a user, the definition specifying a query on which the service class is to be based and operations to be enabled for the service class;

automatically generating application code for the service class based on the received definition, the application code exposing the service class to an internal endpoint of the enterprise resource planning system, the application code customizable by the user; and automatically generating an external interface for the service class based on the generated application code and any customization by the user, the external interface exposing the service class to an external endpoint of the enterprise resource planning system; and a processor that executes the computer-executable instructions stored in the memory.

15. The computing device of claim 14 wherein the query specifies data that is to be retrieved from the enterprise resource planning system.

16. The computing device of claim 14 wherein the operations are selected from a group consisting of create, read, update, delete, find, and findkeys.

17. The computing device of claim 14 wherein the method includes registering the service class by the user.

18. The computing device of claim 14 wherein the definition of the service class is received from the user via a user interface tool.

* * * * *